Jan. 2, 1923.

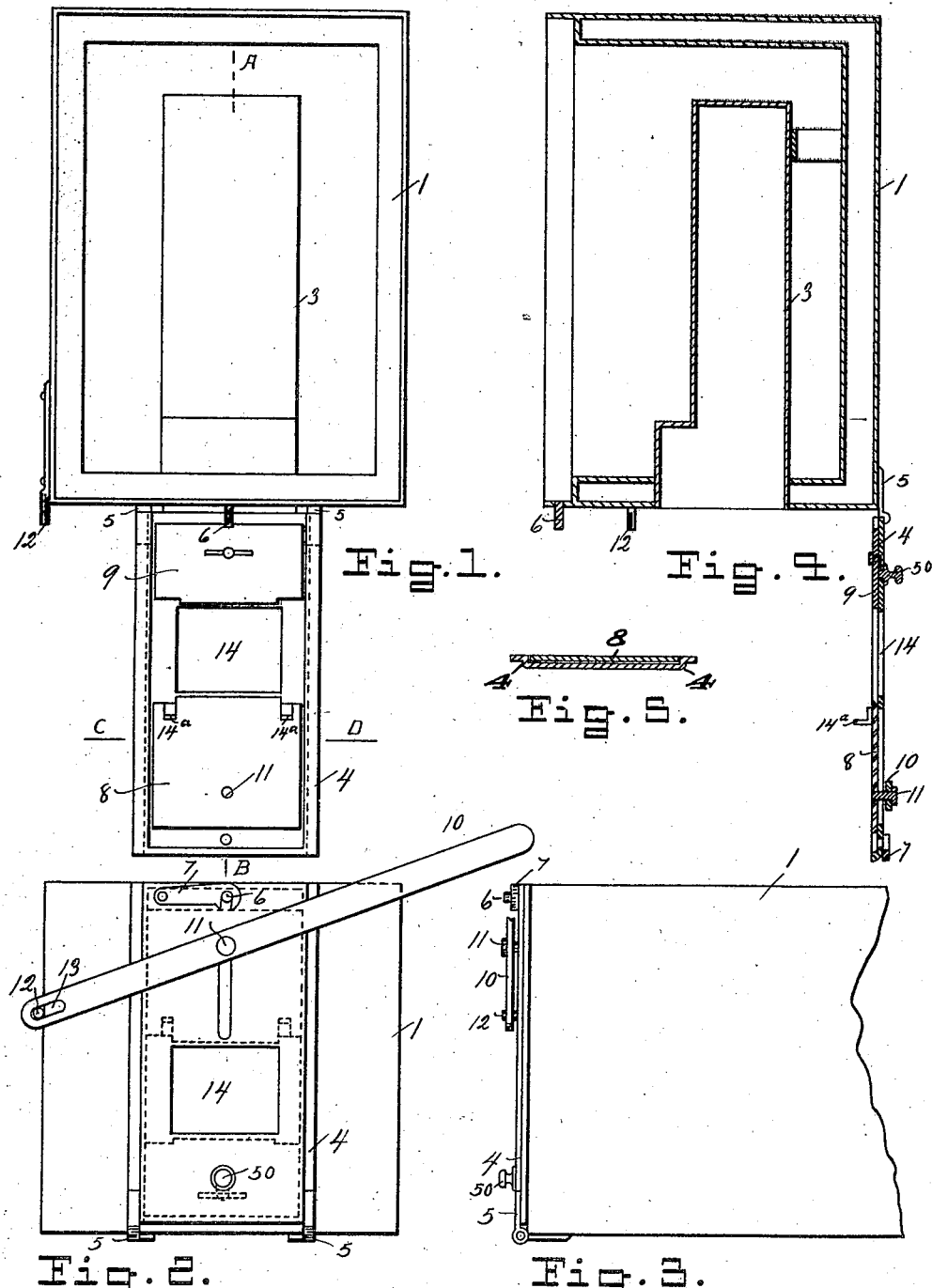

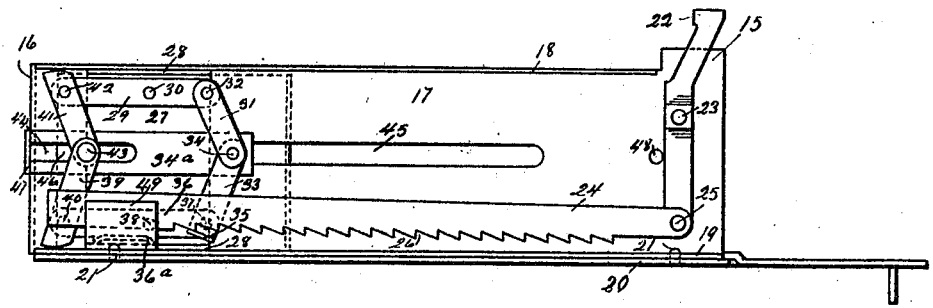

A. W. LARSON.
ICE CREAM SLICING MACHINE.
FILED JUNE 28, 1920.

WITNESSES,
Bertha French
Frances French

INVENTOR.
ALBERT. WILLIAM. LARSON.
By Charles. Albert. French.
ATTORNEY.

Patented Jan. 2, 1923.

1,440,686

UNITED STATES PATENT OFFICE.

ALBERT W. LARSON, OF MADISON, WISCONSIN.

ICE-CREAM-SLICING MACHINE.

Application filed June 28, 1920. Serial No. 392,480.

*To all whom it may concern:*

Be it known that I, ALBERT W. LARSON, a citizen of the United States, residing at Madison, in the county of Dane and State of Wisconsin, have invented certain new and useful Improvements in Ice-Cream-Slicing Machines, of which the following is a specification.

My invention relates to ice cream slicing machines; and the objects of my invention are, first, to provide a device in which the container for the ice cream in brick form is independent of the ice chest; second, to provide a feeding and slicing means, which are automatic and positive; third, to provide a container for the ice cream bricks adapted to be moved backward into the ice chest a distance from the slicer.

I attain the above and other objects which will be apparent upon perusal of the following complete specification, by the mechanism illustrated in the accompanying drawings in which—

Fig. 1, is a plan of ice chest with door open.

Fig. 2, is a front elevation of same.

Fig. 3, is a right side elevation broken away.

Fig. 4, is a vertical longitudinal section on line A—B, Fig. 1.

Fig. 5, is a horizontal section thru door on line C—D.

Figure 6:
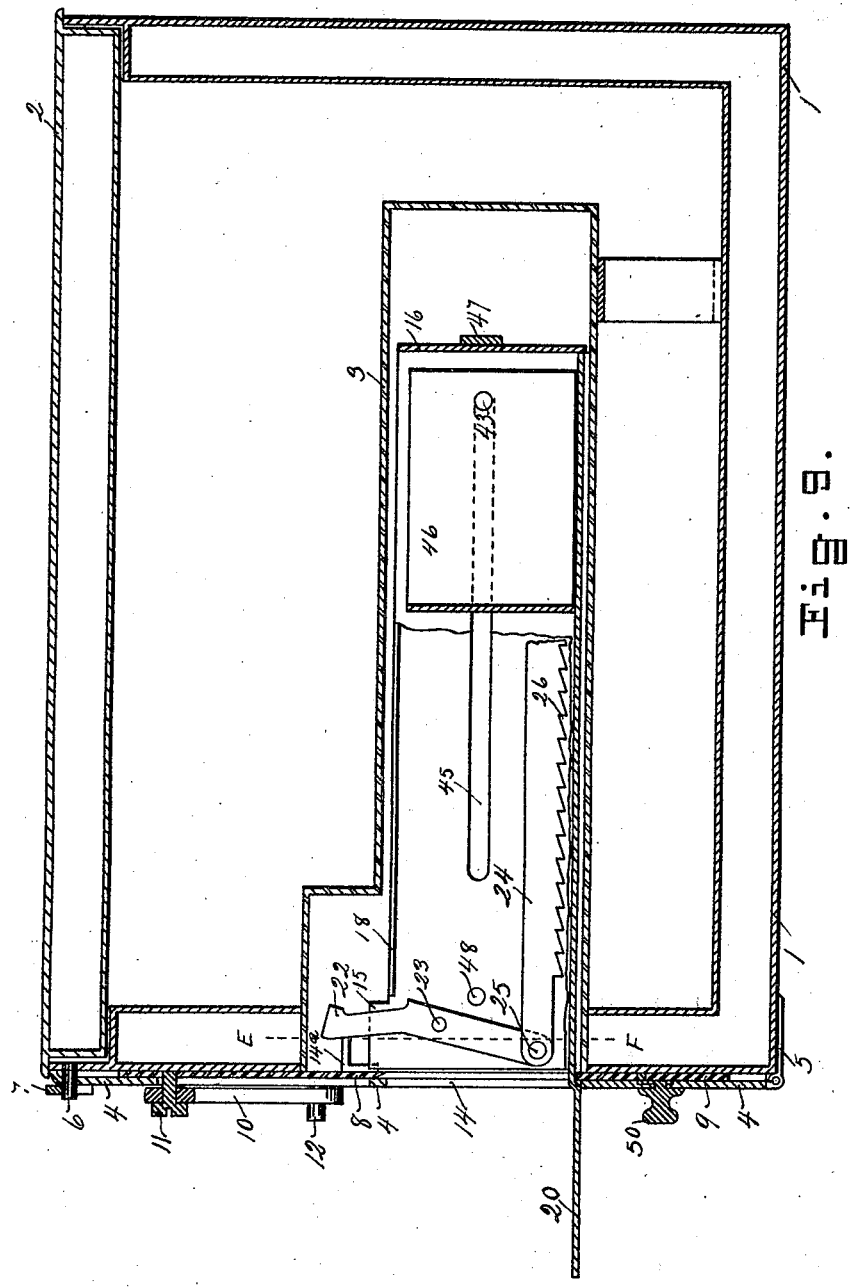
Fig. 6, is a left side elevation of container with follower withdrawn.

Fig. 7, is a plan of container with follower withdrawn.

Fig. 8, is a left side elevation of container with follower advanced.

Fig. 9, is a partial vertical longitudinal section on line A—B, with door closed.

Similar characters of reference refer to corresponding parts throughout the several views.

The ice chest 1, which is constructed in box form comprises a double bottom, side and end walls with insulation between the walls. The top is open adapted to receive a cover 2, which is also double walled and insulated. A compartment 3, is disposed longitudinally of the chest and is open through the front wall of same and a door 4, is attached thereto by hinges 5, at the bottom and stud 6, and latch 7, at the top, to the front and central portion. The door 4, is recessed longitudinally forming a race for the slicer plate 8, and locking plate 9, see Fig. 5. A hand lever 10, is pivotally connected to the slicer plate 8, by a screw 11, and extends backward a distance beyond the edge of the chest 1, and is slidably disposed on a pin 12. A slot 13, in the end of the lever 10, provides for the movement on the pin. An opening 14, in register with the front end of the compartment 3, is provided in the door which is closed when the slicer plate 8, is in its lowest position, and open when the slicer is raised by lifting the handle 10. Two actuating lugs 14$^a$, are secured to the slicer plate on each inner edge and travel on line E—F, Fig. 9. A container 15, comprising rear wall 16, and side walls 17, with the top flanges 18, and bottom flanges 19, is located on top of a base plate 20 and held in position by pins 21. Forward of the top flanges 18, and extending across the top and down the outside of the container is disposed yoke 22, which is pivotally secured to the same by the studs 23, and notched feeding bars 24, are loosely attached to the lower ends of the yoke by rivets 25. Said feeding bars extend backward a distance from the rivets and are provided with notches 26, for a distance and terminate in a portion equal in width to the front portion and the depth of the notches 26. Adjustable catches 35 for engaging the notches are pivotally attached to the sliding plates 27 on both sides of the container between the flanges 18 and 19. Said plates have outwardly projecting flanges 28 both top and bottom. A bar 29, is pivotally disposed on the plates near the top flanges by the rivets 30. To the front ends of the bars 29 are pivotally connected the arms 31 by rivets 32, and the lower ends of said arms are pivoted to the arms 33 and horizontal plates 34$^a$ by rivets 34. The lower ends of the arms 33 are provided with the outwardly projecting flanges 35, at right angles to the arms both as to thickness and width. A distance above the flanges the front ends of the second bars 36 which are provided with the shoes 36$^a$ are pivotally connected by the rivets 37. Said bars 36 are attached to the plates 27 by the rivets 38, and extend backward and are pivotally attached to the arms 39 by the rivets 40. The arms 41 are loosely secured to the rear ends of the bars 29, by the rivets 42, and the lower ends of the said arms, and the upper ends of the arms 39 are loosely disposed on the outer ends of the shaft 43. Said shaft extends from side to side through the slots 44 in the rear ends of the plates 34ᵃ and slots 45 in the side walls 17 of the container 15, and through both the side walls 46 of the follower, thereby connecting the feeding mechanism on the outside of the container through the slots 45 with the follower and causing the two to move simultaneously. Across the rear end of the container 15, a bar 47 is secured about mid-way from top to bottom and extends beyond the sides a distance, and is adapted to engage the slotted ends of the bars 34ᵃ when the follower is pushed to the extreme rear end of the container. By so doing the bars 34ᵃ are forced forward and the arms 31 and 33 are disposed at an angle to each other and the ledges 35 assume an angle corresponding to the angle of the notches 26 in the feeding bars 24, and upon which the notches will catch. At the same time the arms 39 and 41 will be forced upward into contact with the flanges 18 and 19, preventing the follower being pushed backward when the notches 26 of the notched bars 24 are forced backward over the ledges 35, and the reciprocating of the bars 24 will move the follower forward and force the brick of cream out of the container and under the slicing plate 8, see Fig. 6, for working positions. When the follower has been advanced to its forward limit and the ice cream brick expelled, the front ends of the bars 34ᵃ will come into contact with the pins 48, thereby forcing the arms 31 and 33 into vertical alignment and through the bars 29 and 36, pivoted at 30 and 38, cause arms 39 and 41 to recede from contact with the flanges 18 and 19, and raise the shoes 36ᵃ so that the notches 26 on the bars 24 will be clear of the flanges 35, see Fig. 8, and the follower and feeding device can be pushed back and assume the position as shown in the Fig. 6. By referring to Fig. 9, it will be seen, that by moving the slicer plate 8 up and down by means of the handle 10 the lugs 14ᵃ will cause the yoke 22 to swing on the pivots 23, and reciprocate the feeding bars 24, and carry the follower forward, see Figs. 6 and 7, for the rear positions of the follower and feeding mechanism. A shield plate 49 is attached to the lower flanges 28 to prevent the feeding bars working off of the ledges 35. As before mentioned, the bottom of the container is detachable for convenience in cleaning, and extends forward of the slicer plate a distance to receive the detached cream while slicing. Where said bottom passes through the door 4, it is depressed to form a ledge on the under side, against which the locking plate 9 abuts when in its upper position, holding the container forward while in position for slicing, but when not in use, the knob 50 can be turned in either direction releasing the container so it may be pushed back into the compartment 3, and removing the cream a distance from the slicer plate and allowing the circulation of cold air between the two.

Having thus described my invention I claim:

1. In a device of the kind described, an ice chest, a compartment within the chest extending longitudinally thereof from the front backward and closed at the rear end, a door hinged to the chest and adapted to close the front of the compartment, a recess formed within the door, a slicing plate and locking plate located within the recess a handle pivoted to the chest and attached to the slicing plate for reciprocating the plate within the recess, a container adapted to receive a brick of ice cream and be deposited within the compartment, a follower slidably disposed within the container, a shaft passing through the follower and out through both sides of the container and attached to feeding mechanism for carrying the brick of cream ahead of the follower and out under the slicing plate.

2. In a device of the kind described, an ice chest with a compartment within the same, a container insertable within the compartment, a follower slidably disposed within the container a shaft passing through the follower and extending through the slots in the side walls of the container, plates attached to the outer ends of the shaft and guided by the top and bottom flanges of the container, a combination of horizontal plates and vertical arms pivotally connected together and to the plates attached to said shaft, whereby, in conjunction with the handle attached to the slicing plate lugs on the slicing plate, a yoke on the container, and notched feeding bars, the follower can be forced forward or released and pushed backward within the container.

In testimony whereof I affix my signature in the presence of two subscribing witnesses.

ALBERT W. LARSON.

Witnesses:
PETER CHAS. FALK,
FRANCES FRENCH.